(12) United States Patent
Michael

(10) Patent No.: US 6,819,242 B2
(45) Date of Patent: Nov. 16, 2004

(54) APPARATUS FOR USE WITH CAPACITIVE PRESENCE DETECTION SYSTEMS

(75) Inventor: Stephen Michael, Sarasota, FL (US)

(73) Assignee: Invisa, Inc., Sarasota, FL (US)

( * ) Notice: Subject to any disclaimer, the term of this patent is extended or adjusted under 35 U.S.C. 154(b) by 0 days.

(21) Appl. No.: 10/398,102

(22) PCT Filed: Oct. 2, 2001

(86) PCT No.: PCT/US01/42435

§ 371 (c)(1),
(2), (4) Date: Jun. 24, 2003

(87) PCT Pub. No.: WO02/29747

PCT Pub. Date: Apr. 11, 2002

(65) Prior Publication Data

US 2004/0008122 A1 Jan. 15, 2004

Related U.S. Application Data

(60) Provisional application No. 60/237,154, filed on Oct. 2, 2000.

(51) Int. Cl.⁷ .............................................. G08B 13/26
(52) U.S. Cl. .................... 340/562; 340/561; 340/551; 340/545.4
(58) Field of Search ................................. 340/506, 566, 340/596, 665, 540, 545.4; 200/61.43, 61.58 R, 61.62; 49/26, 27, 482.1, 493.1; 324/207.16

(56) References Cited

U.S. PATENT DOCUMENTS

| | | | | |
|---|---|---|---|---|
| 4,453,112 A | * | 6/1984 | Sauer et al. | 318/281 |
| 4,691,195 A | * | 9/1987 | Sigelman et al. | 340/545.4 |
| 5,021,666 A | * | 6/1991 | Reber | 250/359.1 |
| 5,239,146 A | * | 8/1993 | Blubaugh | 200/61.43 |
| 5,327,680 A | * | 7/1994 | Miller | 49/27 |
| 5,334,970 A | | 8/1994 | Bailey | 340/506 |
| 5,432,498 A | | 7/1995 | Zilbershtein et al. | 340/566 |
| 5,793,293 A | | 8/1998 | Melamud et al. | 340/596 |
| 6,081,088 A | * | 6/2000 | Ishihara et al. | 318/466 |
| 6,208,316 B1 | * | 3/2001 | Cahill | 343/909 |
| 6,525,651 B1 | * | 2/2003 | Heller | 340/425.5 |
| 6,617,845 B1 | * | 9/2003 | Shafiyan-Rad et al. | 324/207.16 |

* cited by examiner

Primary Examiner—Van T. Trieu
(74) Attorney, Agent, or Firm—Ryder IP Law, P.C.; Douglas J. Ryder

(57) ABSTRACT

An apparatus is provided for use with capacitive presence detection systems. The apparatus includes a sensor (10) in the form of a tape which may be adhesively affixed to an object such as a parking gate (4) arm. Additionally, spaces for use in mounting the sensors (40) are disclosed which increase the depth of field of the sensor. The tape is a sandwich having a plastic film top layer, a metallic foil middle layer, and a plastic bottom layer having an adhesive material.

8 Claims, 2 Drawing Sheets

APPARATUS FOR USE WITH CAPACITIVE PRESENCE DETECTION SYSTEMS

CROSS-REFERENCES TO RELATED APPLICATIONS

The presence application is the national stage under 35 U.S.C 371 of PCT/US01/42435, filed on 02 Oct. 2001, which claimed priority based on Provisional Application No. 60/237,154, filed on 02 Oct. 2000.

FIELD OF THE INVENTION

The invention relates to sensing apparatus for use with capacitive presence detection systems.

BACKGROUND OF THE INVENTION

Motion detection systems are known for detecting the presence of a person or vehicle to a device such as a parking gate. One type of system that utilizes the rate of change in frequency of a signal from an oscillation from a continuous wave output is disclosed in U.S. Pat. No. 5,337,039 to Simon. The system utilizes an oscillator which produces a wave in a preset frequency range which is delivered to a capacitive plate or sensor. The sensor is mounted to a device such as a parking gate. The sensor is in the form of a coaxial cable which functions as one plate of a capacitor. The cable is attached by clips to the gate. When the sensor nears conductive objects, the frequency of the preset signal changes. An error signal is generated if the rate of change in frequency exceeds a predetermined rate. The error signal is sent to a control unit which emits a signal to stop the movement of the gate. If the gate is wood, the sensor is affixed to the bottom of the gate. However, if the sensor is used with a metal object such as a garage door, the sensor cannot be attached directly to the metal without drastically reducing the capacitive field and thus the range of the detection.

It is an object of the invention to provide sensing apparatus for use with capacitive presence sensing detection which provides easy installation. It is also an object of the invention to provide a sensor with a proper field of detection when mounted to conductive objects such as metal doors and gates.

SUMMARY OF THE INVENTION

The invention relates to improvements in capacitive sensors and spacers for improving the depth of field of capacitive presence sensing systems. In one embodiment suited for use with a wooden substrate such as a parking gate, the sensor is a flexible tape formed of a sandwich of Mylar film, metal foil and a flexible spacer having an adhesive on one side. The tape may be adhered directly to the bottom of a parking gate for use as a sensor. Also disclosed is a nonconductive sleeve member for use with a tubular metal arm to permit attachment of the sensor directly to the distal end of the arm. In another embodiment, the sensor is mounted to an object with a spacer. The spacer has a body with a low dielectric constant to space the sensor a predetermined distance from a conductive material such as a garage door.

BRIEF DESCRIPTION OF THE DRAWINGS

Other features and advantages of the present invention will become apparent to those skilled in the related arts upon reading the following description with reference to the accompanying drawings in which.

DETAILED DESCRIPTION OF THE PREFERRED EMBODIMENTS

Figure 1:
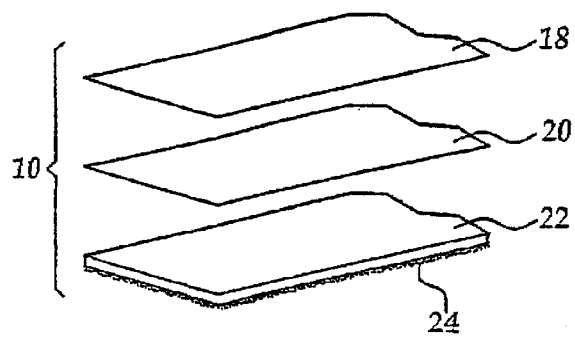
FIG. 1 is a perspective exploded view of a sensor for use with a capacitive presence sensing system.
Figure 2:
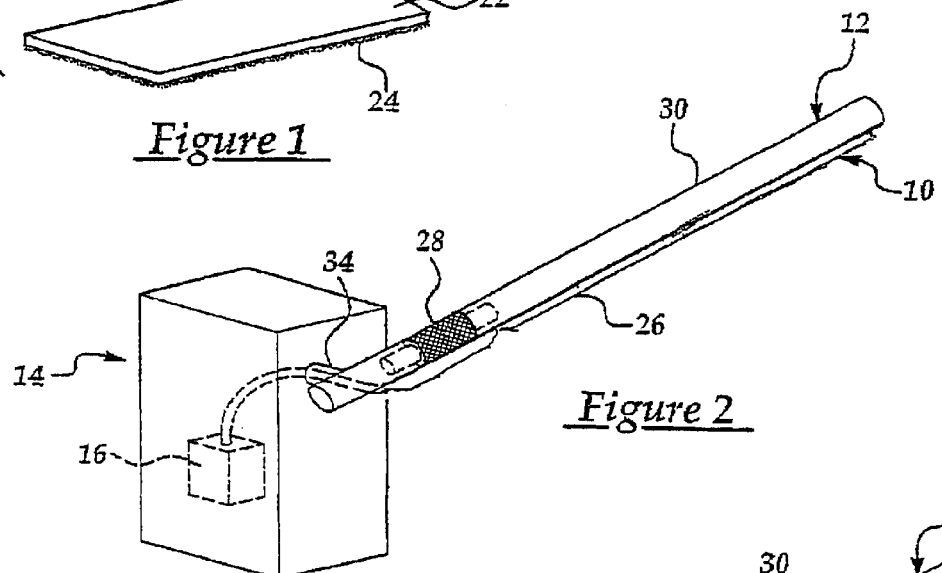
FIG. 2 is a side view of a metal parking gate having a nonconductive sleeve in accordance with an alternative embodiment of the invention.

As shown in FIGS. 1 and 2, an improved motion detection sensor 10 is in the form of a flexible tape for use on an aim 12 of a parking gate 4. The sensor can be used on any nonconductive surface such as a wooden parking gate, a window frame, wooden door, or metal surface isolated from the ground, etc. in conjunction with a capacitive presence detection system 16. As shown in FIG. 1, the tape is formed as a sandwich having a top layer 18 of nonconductive Mylar film, a center layer 20 of metal such as copper foil, and a bottom layer of flexible nonconductive polyester material 22. An adhesive material 24 is applied to the bottom surface of the polyester material to permit easy installation of the sensor directly to the surface of structures which it is to be used on. The sensor 10 is connected to a control unit of the presence sensing system 16 by a coaxial cable 20. The metal foil is electrically connected to a center wire of a coaxial cable delivering an oscillator signal from the control unit to the sensor.

Figure 3:
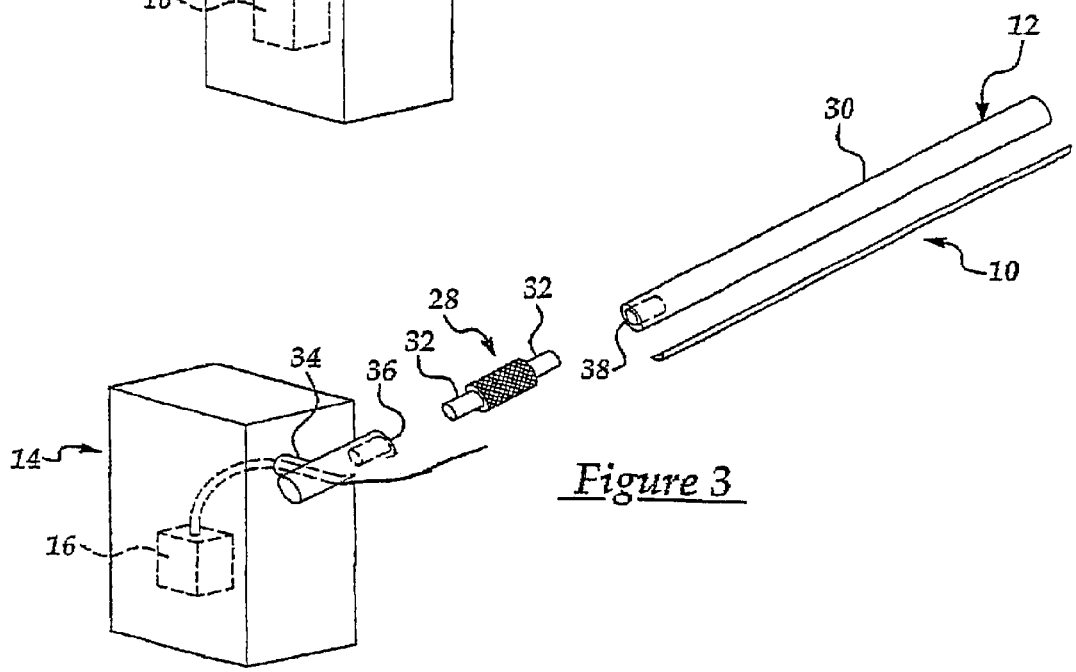
FIG. 3 is an exploded view of a gate arm and spacer in accordance with the invention.

As shown in FIG. 2, when the sensor 10 is used on an arm formed of conductive material such as metal. An isolating sleeve 28 is used to electrically isolate a distal portion of the arm from the ground. The sensor is adhered to the distal portion 30 of a tubular arm 12. The sleeve 28 is formed of rigid or reinforced fiber, reinforced plastic, wood, or nylon. The sleeve 28 has a pair of ends 32 formed to match the inner dimensions of the gate arm. As shown in FIG. 3, the gate arm 12 is severed at an end near a lifting mechanism 34. The sleeve 28 is inserted into the openings of each end 36, 38 of the arm. The ends 36, 38 of the gate are frictionally fixed to the sleeve 28 but separated a distance to electrically isolate the distal end 30 of the gate. The sensor 10 is affixed to a distal portion 30 of the gate arm.

Figure 4:
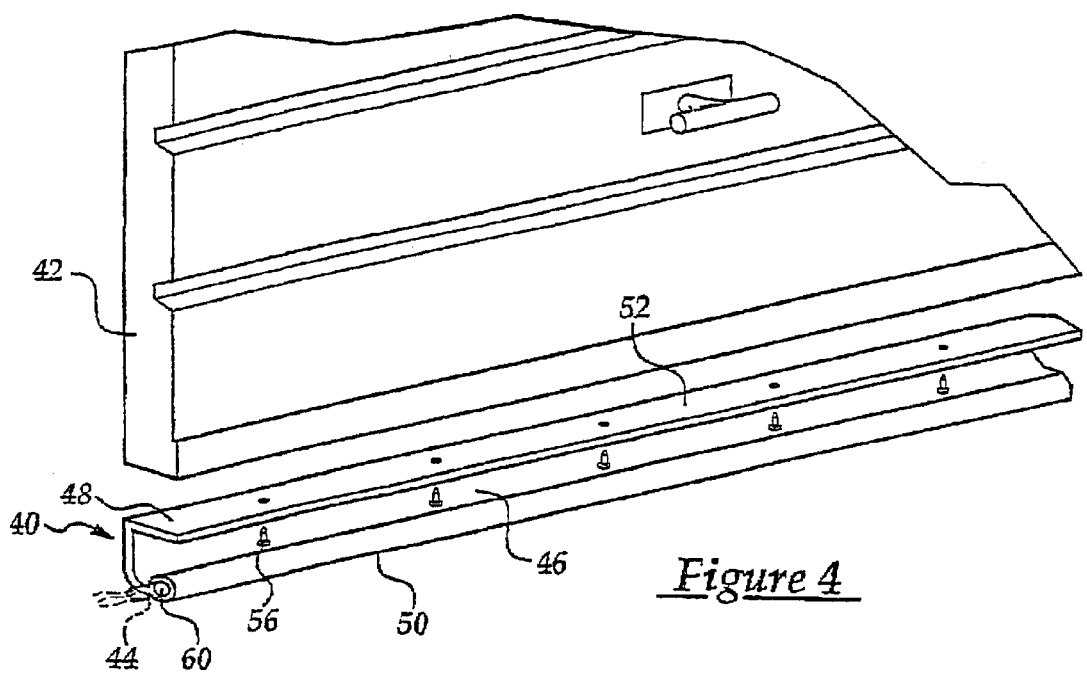
FIG. 4 is a perspective view of a spacer for a sensor shown for use with a garage door in accordance with the invention.

As shown in FIG. 4, a novel sensor support 40 is shown for use with a conductive structure such as a metal garage door 42. When a capacitive sensor 44 is separated from conductive material by a material having a low dielectric constant such as air, certain synthetic materials, i.e. polypropylene, polystyrene foam, etc. The sensor 44 is provided with a greater depth of field thereby extending the distance by which the system can detect presence. The sensor support 42 has a body formed of an extrusion of a synthetic compound such as polypropylene and has an arm 46 extending between a mounting portion 48 and an end portion 50. The mounting portion 48 extends longitudinally and has a surface 52 adapted to abut the garage door 42. Plastic screws or fasteners 56 are used to attach the sensor support 40 to the door 42. The arm 46 is L-shaped and extends downwardly and curves to support a tubular portion 58 in the end portion coaxially with the bottom of the door. The tubular portion 58 has a circular bore 60 which extends through the end portion 48 to permit installation of the sensor 44 such as a coaxial cable. A slit 62 may be formed in the tube to facilitate installation of the cable under the bore 60. In this way the sensor 44 is suspended a predetermined distance such as two inches beneath the garage door 42 and is separated from the door by a material having a low dielectric, namely air. The arm 46 is flexible, permitting displacement of the end portion when contacting the floor or door frame as the door is being closed.

Figure 5:
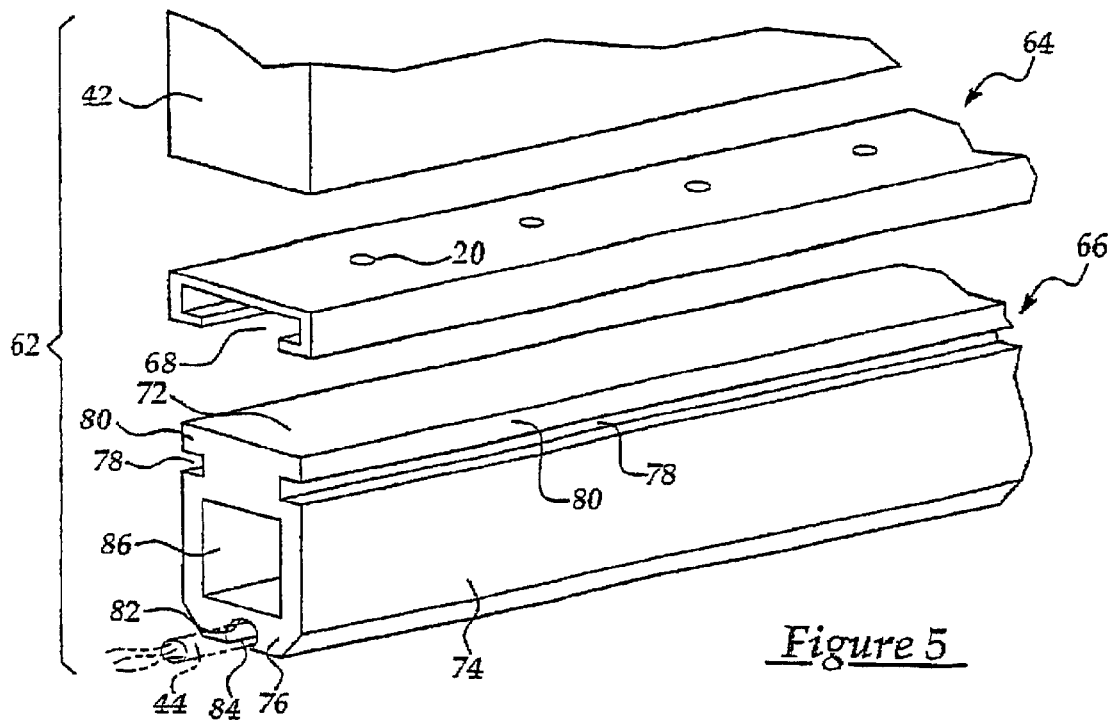
FIG. 5 is an alternative embodiment of a spacer for a sensor and shown in accordance with the invention.

As shown in FIG. 5, an alternative embodiment of a sensor support 62 is formed of a hanger 64 and an insert 66. The hanger 64 and insert 66 are formed of extruded plastic material with a low dielectric such as polypropylene. The hanger is in the form of a C-shaped channel having an opening 68 extending longitudinally. Apertures 70 are provided to permit mounting of the hanger to the door 42 by a fastener. The insert has an upper portion 72, a pair of sides 74, and a bottom portion 76. Each side 74 has a groove 78 spaced downwardly from the top 72 a distance forming a pair of flanges 80 complementary to the inner dimensions of the opening 68 of hanger 64. The bottom portion 76 is tapered inwardly towards the center and has a cylindrical bore 82 extending down the center with a slit 84 which extends axially along the bottom to facilitate insertion of the sensor or coaxial cable 44 into the bore 82. The sensor 44 is pushed through the slit 84 into the bore and is maintained by a pair of flanges 86 formed on either side of the slit. A rectangular opening 86 may be formed in between the top and the bottom portion to extend longitudinally through the insert to permit deformation of the insert and to permit air to be contained therein. Alternatively, the insert may be solid if the material used has a very low dielectric constant.

Numerous substitutions and modifications can be taken without departing from the spirit and scope of the invention as defined in the claims.

What is claimed is:

1. An apparatus for use with a capacitive presence sensing device used in connection with a metallic object, said sensing device having a sensor formed of flexible conductive material, said apparatus comprising:

an elongated body formed of flexible nonconductive material, said body having a mounting surface adapted for mounting to the object, said body having a distal portion on an opposite side from said mounting portion to support said sensor a predetermined distance from said mounting surface.

2. The apparatus of claim 1, wherein said distal portion has a bore extending on an axis generally parallel to said mounting surface for holding said sensor.

3. The apparatus of claim 1, wherein said body is formed of a dielectric material.

4. The apparatus of claim 1, wherein said body has an opening extending between said mounting portion and said distal portion.

5. A method for connecting a sensor for a capacitive presence sensing device to a conductive tubular member, said method including the steps of:

severing the tubular member into a support portion and a distal portion;

inserting one end of a spacer of nonconductive material into an interior cavity of one of said distal portion;

inserting another end of said plug into the support portion such that the ends of said distal portion and said support portion are spaced apart a predetermined distance; and connecting the sensor to said distal end of the tubular device.

6. A sensor for use with a capacitive presence sensing system, said sensor connected to a signal generator generating a wave having a frequency, said frequency changing in response to the presence of conductive material in a electromagnetic field about the sensor, said sensor comprising an elongated member formed of a sandwich of a nonconductive bottom layer, a middle layer of metal foil, and a flexible top layer, said bottom layer having an adhesive on an outer surface.

7. The sensor of claim 6 wherein said bottom layer is formed of polyester.

8. The sensor of claim 6 wherein said top layer is formed of a plastic film.

\* \* \* \* \*